(12) United States Patent
Carau, Sr.

(10) Patent No.: US 6,318,825 B1
(45) Date of Patent: Nov. 20, 2001

(54) DRY ERASE ELECTRONIC WHITEBOARD WITH PAGE-WIDE-ARRAY INKJET PRINTER

(75) Inventor: Frank P. Carau, Sr., Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/177,399

(22) Filed: Oct. 23, 1998

(51) Int. Cl.[7] ....................................................... B11J 2/01
(52) U.S. Cl. ................................................................ 347/2
(58) Field of Search .................................. 347/2, 4, 104, 347/8; 358/285, 293, 294; 395/162; 396/6; 156/230

(56) References Cited

U.S. PATENT DOCUMENTS 4,725,889 * 2/1988 Yanvi et al. ..................... 358/285
5,455,906 * 10/1995 Usuda .............................. 395/162
5,900,094 * 5/1999 Santini ............................ 156/230

* cited by examiner

Primary Examiner—John Barlow
Assistant Examiner—Charles W. Stewart, Jr.

(57) ABSTRACT

A device for electronically capturing an image on a whiteboard, storing the image and then putting the captured image back onto the whiteboard using dry erase ink in an inkjet printhead array. The image capture portion of the device may include an image capture array that is a whiteboard-wide-array of image capture elements. The image replace portion of the device may include a whiteboard-wide-array of inkjet printhead elements. The data storage portion of the device may either be on the device or off of the device or both. The device may also be capable of interactive whiteboard image manipulation from a remote location via the Internet, telecommunications, facsimile, infrared, modem, or other known electronic data transmission means.

19 Claims, 3 Drawing Sheets

DRY ERASE ELECTRONIC WHITEBOARD WITH PAGE-WIDE-ARRAY INKJET PRINTER

FIELD OF THE INVENTION

The present invention relates generally to the field of electronic whiteboards and more particularly to a dry erase electronic whiteboard with a page-wide-array or board-wide-array inkjet printhead mechanism.

BACKGROUND OF THE INVENTION

Whiteboards with erasable markers for interactive discussions have widespread use in business and educational settings. There are also various types of electronic whiteboards and chalkboards available that are capable of capturing the image on the board and transferring the image to a copier. However, it would be valuable to be able to electronically put information back onto a whiteboard. For example, if a meeting, seminar or class has been suspended and resumed at a later time, it would be valuable to have the previous white board information put back on the board in order to continue the meeting or discussion. Alternatively, if a meeting must be moved to another room and reconvened, it would be advantageous to have the information on the whiteboard automatically recopied onto the whiteboard in the new meeting room. It would also be desirable for a whiteboard to be able to electronically put charts, graphs, scanned information or other electronically stored information onto the whiteboard for discussion. It would also be desirable to have a solution that is adaptable to any white board. It is possible to electronically put information on a large, flat computer screen and then store, transmit or manipulate the data. However, this is an expensive and not widely available solution.

SUMMARY OF THE INVENTION

The above and other aspects of the present invention are accomplished in a dry erase electronic whiteboard with a page-wide-array or board-wide-array inkjet printhead mechanism. Specifically, an electronic whiteboard is disclosed that is capable of scanning the surface of the whiteboard and storing the information rather than printing it out on paper. The electronic whiteboard use dry erase ink in a page-wide-array or board-wide-array inkjet printhead to put the information back onto the whiteboard at a later time. Alternatively, the electronic whiteboard may send the information to another electronic whiteboard, to a storage device, such as a floppy disk or a CD to be retrieved later by the same or a different electronic whiteboard and put back onto the whiteboard with dry erase ink by a board-wide-array inkjet printhead. Still further, the electronic whiteboard may electronically receive stored information from a computer, a fax, a floppy disk, a CD or other known means and electronically put the received information onto the whiteboard using dry erase ink by means of a board-wide-array inlet printhead. The electronic whiteboard scanner/inkjet printer head of the present invention may also be portable and usable with any standard whiteboard.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

Figure 1:
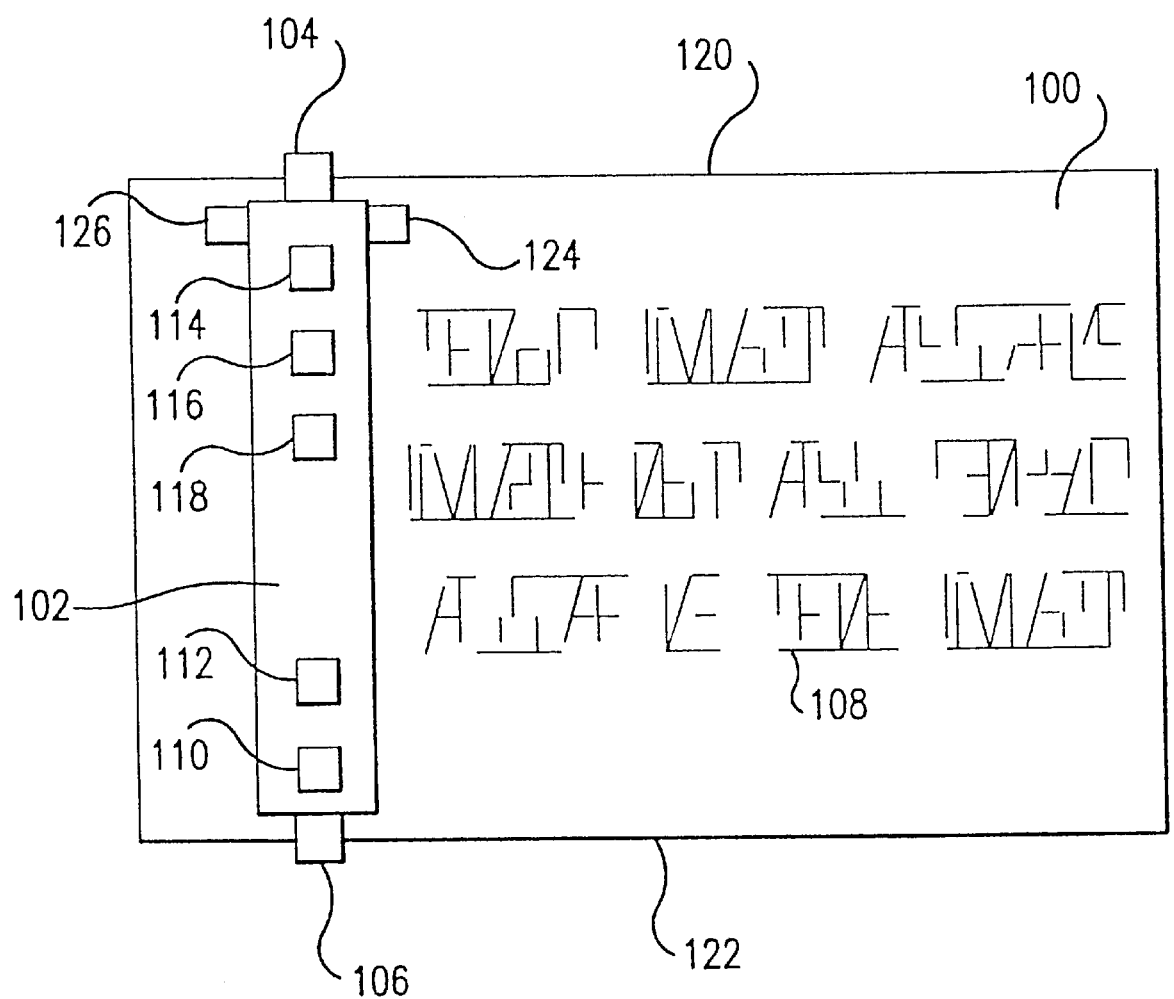
FIG. 1 shows an electronic whiteboard according to the present invention.

FIG. 1 illustrates an electronic whiteboard 100 with a whiteboard image capture/inkjet printhead device 102. The whiteboard image capture/inkjet printhead device 102 may have an on/off button 114, an image capture or scan start button 116, an inkjet printer start button 118, at least one data input port 112, and at least one data output port 110. The whiteboard image capture/inkjet printhead device 102 may clamp onto the top and/or bottom edge 120 and/or 122 of the whiteboard 100 and have motorized wheels 104 and 106 that run along the top and bottom edges 120 and 122, respectively, of the whiteboard 100 during the image capture and image printing procedures. The whiteboard image capture/inkjet printhead device 102 may have a visual sensor or tracking system 124 and 126 for determining when the whiteboard image capture/inkjet printhead device 102 is near either end of the whiteboard 100. The image capture portion of the whiteboard image capture/inkjet printhead device 102 may include any known image capture means, such as for example, a CCD array that is a whiteboard-wide-array. Obviously, it is not necessary for the CCD array to be a whiteboard-wide-array, but that would be the most efficient method of performing the image capture portion of the function. The power source could be an onboard power supply such as a battery or an AC power supply source.

Inkjet printing mechanisms use inkjet cartridges, often called "pens," which shoot drops of liquid colorant, referred to generally herein as "ink," onto a page, document or other printing surface. Each pen has a printhead formed with very small nozzles through which the ink drops are fired. To print an image, the printhead is propelled back and forth across the page or surface, shooting drops of ink in a desired pattern as it moves. The particular ink ejection mechanism within the printhead may take on a variety of different forms known to those skilled in the art, such as those using piezoelectric or thermal printhead technology. For instance, two earlier thermal ink ejection mechanisms are shown in U.S. Pat. No. 5,278,584 entitled Ink delivery system for an inkjet printhead by Keefe, et al. and U.S. Pat. No. 4,683,481 entitled Thermal ink jet common-slotted ink feed printhead by Johnson, both of which are assigned to the present assignee, Hewlett-Packard Company, and are incorporated herein by reference.

In a thermal ink ejection system, a barrier layer containing ink channels and vaporization chambers is located between a nozzle orifice plate and a substrate layer. This substrate layer typically contains linear arrays of heater elements, such as resistors, which are energized to heat ink within the vaporization chambers. Upon heating, an ink droplet is ejected from a nozzle associated with the energized resistor. By selectively energizing the resistors as the printhead moves across the page, the ink is expelled in a pattern on the print media to form a desired image (e.g., picture, chart or text). A page-wide-array inkjet printer includes a printer element defining a printhead with thousands of nozzles that span the entire page width. In the present invention, the printer element would preferably have a whiteboard-wide-array defining a printhead with a predetermined number of nozzles that span the entire height of a whiteboard 100.

The whiteboard image capture/inkjet printhead 102 travels along a media path adjacent to the printhead to receive character or graphic markings. Typically, a whiteboard image capture/inkjet printhead 102 accelerates from rest to a constant velocity. To optimize print speed, nozzle timing is controlled to respond to changes in the whiteboard image capture/inkjet printhead 102 velocity. A sensor positioned in fixed relation to board-wide-array printer element detects the whiteboard image capture/inkjet printhead's 102 actual velocity. Actual velocity is fed back to a printhead controller which compares actual velocity to a rated constant velocity. If actual velocity is slower than the rated velocity, then nozzle timing is adjusted to be slower than a rated timing. If the actual velocity is faster than the rated velocity, then nozzle timing is adjusted to be faster than the rated timing. The nozzle timing versus velocity concept is taught in U.S. Pat. No. 5,719,602, entitled Controlling PWA inkjet nozzle timing as a function of media speed by David E. Hackleman, assigned to the present assignee, Hewlett-Packard Company.

Figure 2:
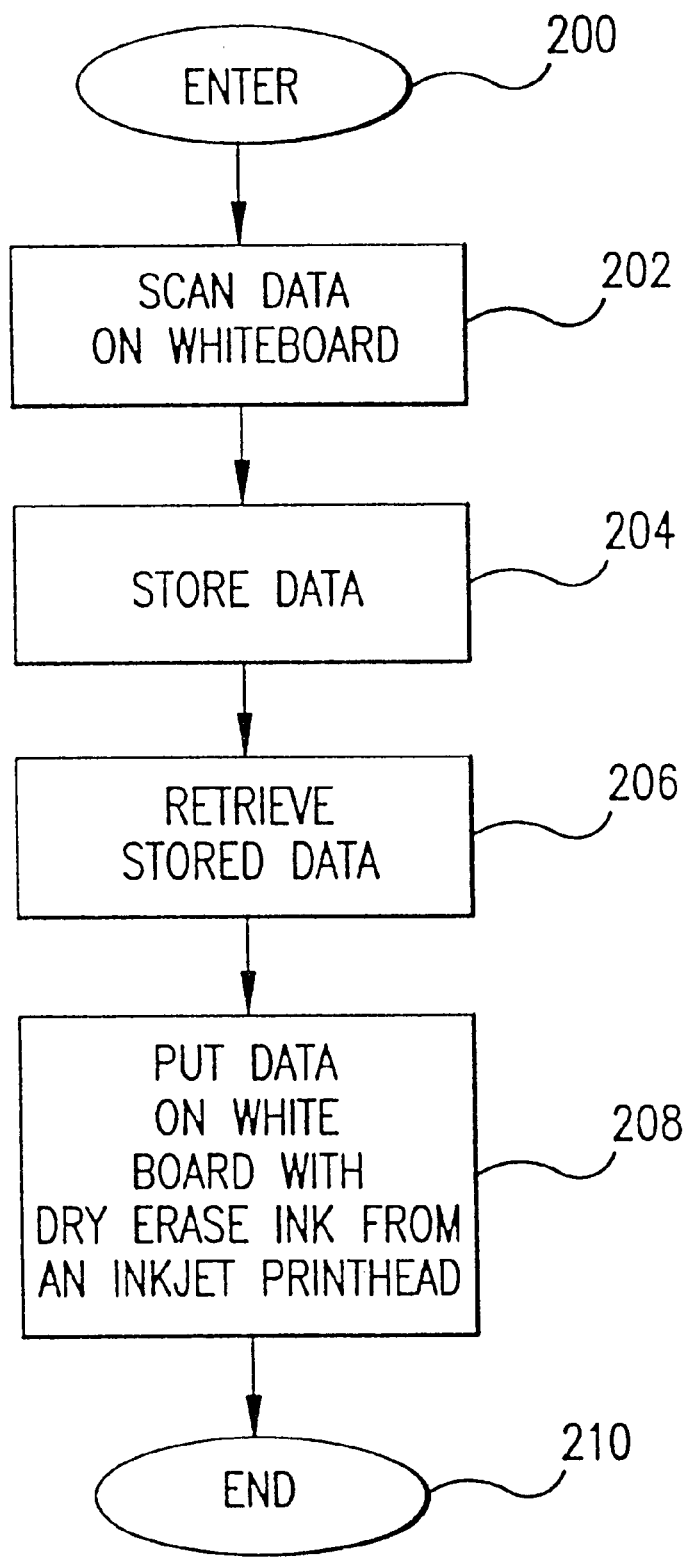
FIG. 2 shows a flow chart of a procedure for an electronic whiteboard to receive information and to put the information onto the whiteboard according to a first embodiment of the present invention.

In a first embodiment, as shown at element 202 of the flow chart of FIG. 2, the operation may include the whiteboard image capture/inkjet printhead device 102 moving from one side of the whiteboard 100 to the other while the image 108 on the whiteboard 100 is scanned or otherwise captured by the whiteboard image capture/inkjet printhead device 102. Next the captured data is stored at 204 in either a buffer, RAM or another form of on board memory, sent to a floppy disk, sent to a computer or otherwise sent to memory. When the session is to be resumed, the same or a different whiteboard image capture/inkjet printhead device 102 may retrieve the data from memory at 206. Once the data is retrieved from memory, the whiteboard image capture/inkjet printhead device 102 may put the data back onto the whiteboard 100 with dry erase ink using whiteboard-wide-arrays of inkjet elements.

Figure 3:
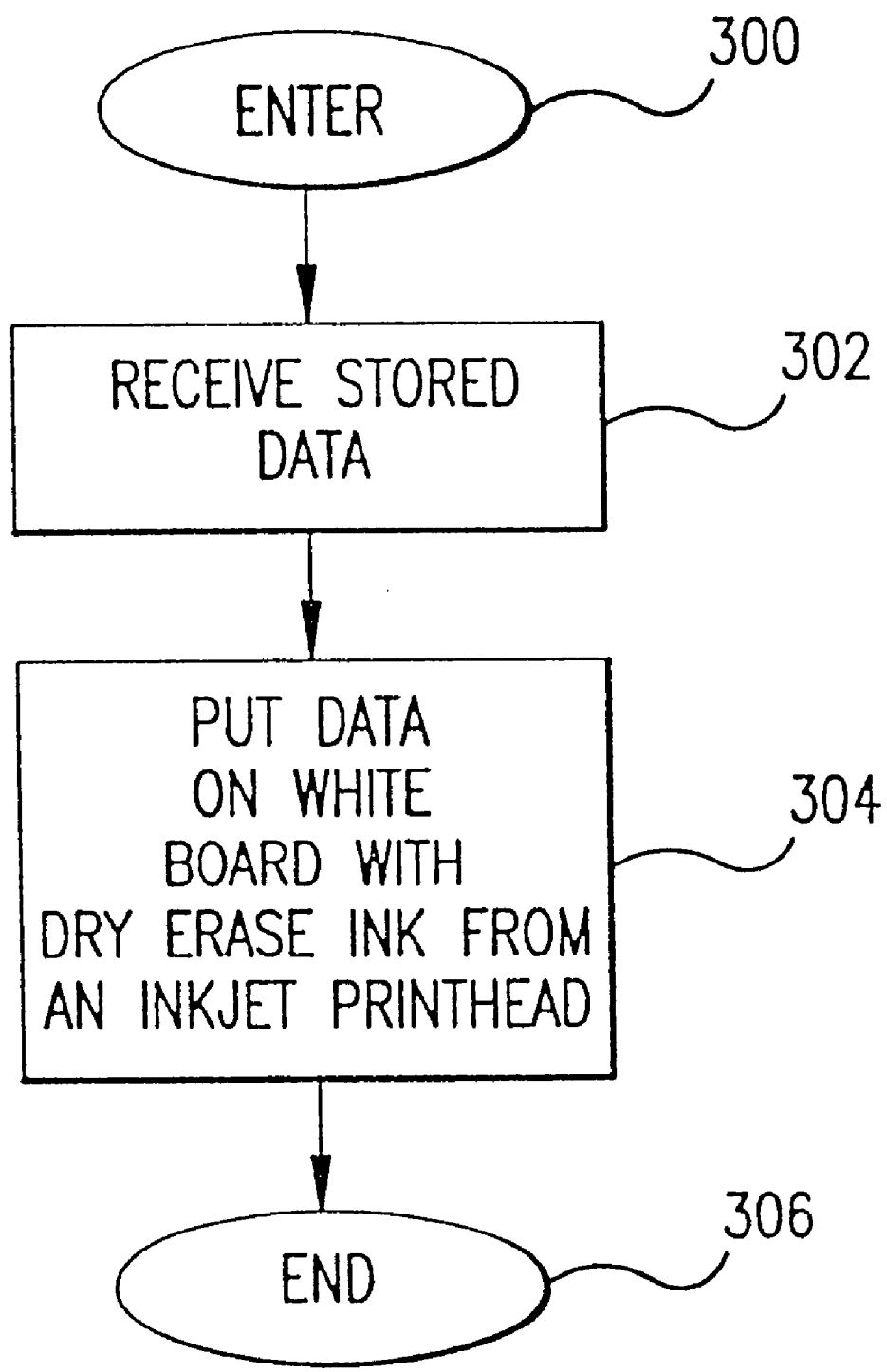
FIG. 3 shows a flow chart of a procedure for an electronic whiteboard to receive information and to put the information onto the whiteboard according to a second embodiment of the present invention.

Another embodiment of the present invention, as shown in the flow chart of FIG. 3, may include the whiteboard image capture/inkjet printhead device 102 receiving electronic data from a computer via a serial or parallel cable, infrared communications, radio communications, telecommunications, modem, Internet, floppy disk, CD, or other known data transmitting means at 302. Next the whiteboard image capture/inkjet printhead device 102 may put the received data onto the whiteboard 100 with dry erase ink using whiteboard-wide-arrays of inkjet elements as shown at 304.

Also, the present invention may be an interactive image capture and inkjet printhead device that is capable of receiving data input real-time from a remote location via a modem, telephone, facsimile, Internet communication line or other known real-time means of electronic data communications. In such a system, the image capture device may be able to save various versions or revisions of the data 108 on the whiteboard 100 for future review and or it may be possible for remote session participants to manipulate or add to the data 108 on the whiteboard 100.

The foregoing description of the present invention has been presented for purposes of illustration and description. It is not intended to be exhaustive or to limit the invention to the precise form disclosed, and other modifications and variations may be possible in light of the above teachings.

For example, the inkjet printhead portion of the whiteboard image capture/inkjet printhead device 102 does not have to be a whiteboard-wide-array of inkjet elements. However, such a device would be less efficient as it would take a significantly longer time to put the image onto the whiteboard 100 and may have to make several passes back and forth across the whiteboard 100 to put a large or complex image onto the whiteboard 100. Also, the present whiteboard image capture/inkjet printhead device 102 may be either portable and capable of attaching to the top and/or bottom edges 120 and 122 of any whiteboard 100, or it may be permanently attached to a whiteboard 100. Further, the functionality of the whiteboard image capture/inkjet printhead device 102 may be controlled remotely by a computer, by infrared, or by other remote control means, rather than by user touch on/off 114, scan 116, and copy 118 buttons.

The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A whiteboard image capture/inkjet printhead device for electronically capturing an image on a whiteboard and putting a stored electronic image onto a whiteboard having a predetermined width, said whiteboard image capture/inkjet printhead device comprising:

an electronic image capture array;

an inkjet printhead array;

an electronic data storage; and a means of attaching to said whiteboard and moving said whiteboard image capture/inkjet printhead device across the width of said whiteboard.

2. The whiteboard image capture/inkjet printhead device according to claim 1, wherein said electronic image capture array is a CCD array.

3. The whiteboard image capture/inkjet printhead device according to claim 2, wherein said CCD array is a whiteboard-wide-CCD array.

4. The whiteboard image capture/inkjet printhead device according to claim 1, wherein said inkjet printhead array is a whiteboard-wide-array of inkjet nozzle elements.

5. The whiteboard image capture/inkjet printhead device according to claim 1, wherein said inkjet printhead array uses dry erase ink to put said stored electronic image onto said whiteboard.

6. The whiteboard image capture/inkjet printhead device according to claim 1, wherein said electronic data storage is a buffer.

7. The whiteboard image capture/inkjet printhead device according to claim 1, wherein said electronic data storage is a RAM.

8. The whiteboard image capture/inkjet printhead device according to claim 1, wherein said electronic data storage is a floppy disk.

9. The whiteboard image capture/inkjet printhead device according to claim 1, wherein said electronic data storage is a CD.

10. A method for capturing an image on a whiteboard and putting the image back onto the whiteboard, said method comprising the following steps:

electronically capturing said image on said whiteboard;

storing the electronically captured image; and putting the electronically captured image back onto said whiteboard using dry erase ink and inkjet printhead array.

11. Apparatus for use with a whiteboard, comprising:

scanner apparatus, said scanner apparatus being operatively associated with the whiteboard so that said scanner apparatus scans an object on the whiteboard and produces an image data signal representative of the scanned object; and printer apparatus, said printer apparatus being operatively associated with the whiteboard so that said printer apparatus prints an image onto the whiteboard, said printer apparatus also being operatively associated with said scanner apparatus so that said printer apparatus receives the image data signal produced by said scanner apparatus and prints an image of the scanned object onto the whiteboard.

12. The apparatus of claim 11, further comprising data storage apparatus operatively associated with said scanner apparatus, said data storage apparatus storing image data signals produced by said scanner apparatus.

13. The apparatus of claim 11, wherein said printer apparatus receives from a remote source image data signals representative of data from a remote source and prints the data onto the whiteboard.

14. The apparatus of claim 11, further comprising a wheel operatively associated with said apparatus and the whiteboard, the wheel allowing said printer apparatus and said scanner apparatus to be moved with respect to said whiteboard.

15. The apparatus of claim 14, wherein said wheel is sized to engage an edge of the whiteboard.

16. The apparatus of claim 11, wherein said printer apparatus comprises a whiteboard-wide-array of inkjet nozzle elements.

17. The apparatus of claim 11, wherein said printer apparatus uses a dry erase ink to print onto the whiteboard.

18. The apparatus of claim 11, wherein said apparatus is operatively associated with a second printer apparatus, said second printer apparatus being operatively associated with a second whiteboard, said second printer apparatus receiving the image data signal produced by said scanner apparatus and printing an image of the scanned object onto the second whiteboard.

19. The apparatus of claim 11, wherein said scanner apparatus comprises a CCD array, said CCD array being a whiteboard-wide-array.

* * * * *